UNITED STATES PATENT OFFICE.

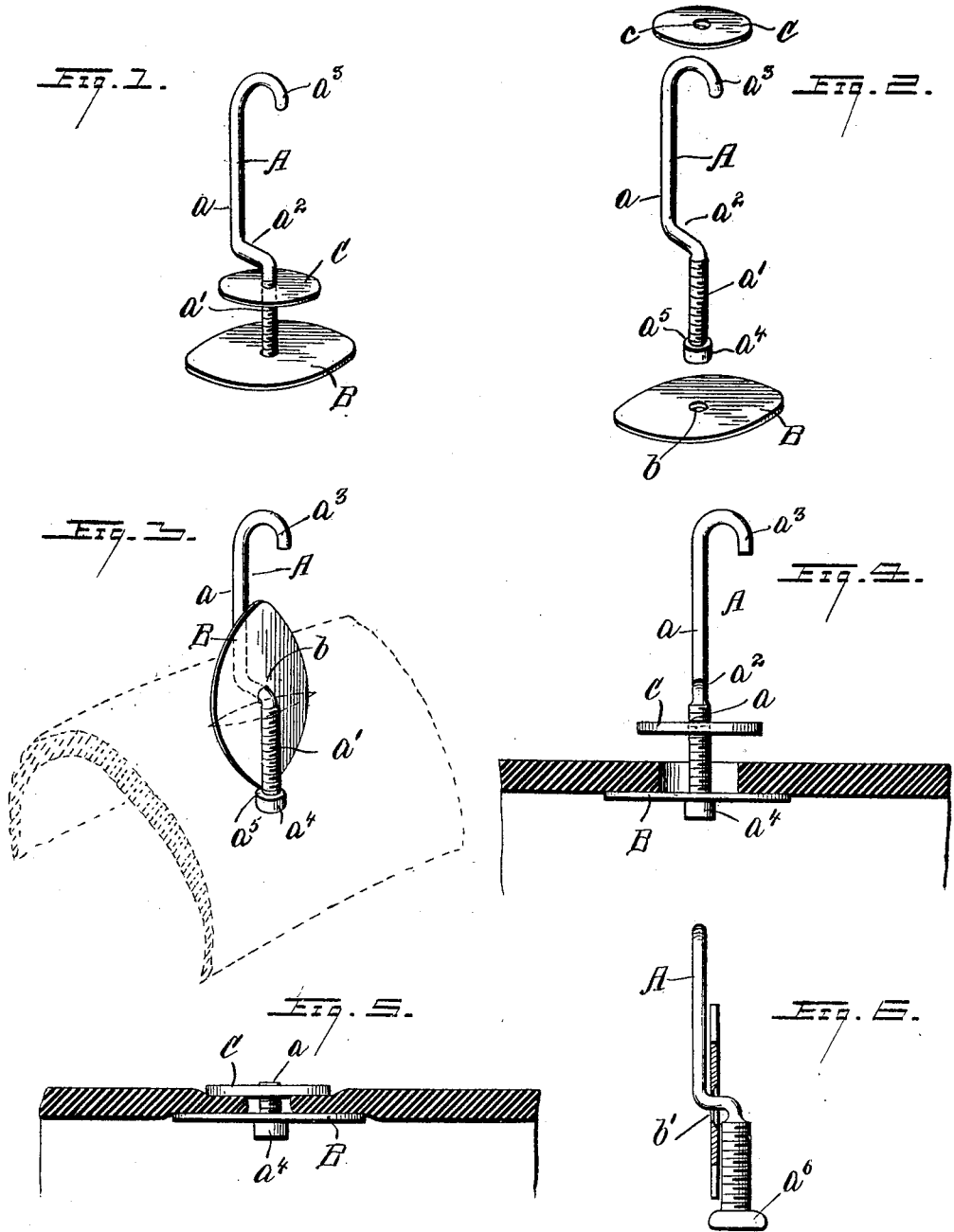

JOHN R. VOSBURGH, OF JOHNSTOWN, NEW YORK.

REPAIR DEVICE FOR TIRES.

No. 823,089.　　　　Specification of Letters Patent.　　　Patented June 12, 1906.

Application filed December 7, 1905. Serial No. 290,845.

*To all whom it may concern:*

Be it known that I, JOHN R. VOSBURGH, a citizen of the United States, residing at Johnstown, in the county of Fulton and State of New York, have invented certain new and useful Improvements in Repair Devices for Tires; and I do hereby declare the following to be a full, clear, and exact description of the invention, such as will enable others skilled in the art to which it appertains to make and use the same.

My invention relates to new and useful improvements in tire repair devices, and more particularly to those of the metal type.

The object of my said invention is to simplify the construction of this class of devices and at the same time so construct the same that they can be more readily applied to the puncture or cut in the tire than those heretofore produced.

In the accompanying drawings I have clearly illustrated my invention, and a full and exact description thereof is contained in the annexed specification.

In the drawings, Figure 1 is a perspective view of my improved repair device. Fig. 2 is a perspective view of the same, showing the parts separated. Fig. 3 is a perspective view showing the device partially inserted in a puncture or cut in the tire. Fig. 4 is a sectional view of a tire, showing my device applied to a cut therein before the repair has been completed. Fig. 5 is a view similar to Fig. 4, showing the repair completed; and Fig. 6 is a modification of my device.

In the several views like letters of reference designate similar parts of my improved device.

A in the drawings designates a shank constructed of wire or the like, preferably of brass, and so bent that the portions $a$ and $a'$ will extend in opposite directions and at approximately right angles to the portion $a^2$. The portion $a$ is provided at its end with a curved portion or arm $a^3$, extending at right angles to the portion $a^2$, and the portion $a'$ is screw-threaded and provided at its end with the enlargement $a^4$, provided with the flattened portion $a^5$.

B is the inner clamping-plate, preferably brass and of elliptical shape, and is provided with the orifice $b$ to enable the same to be slipped onto the shank A, said plate being adapted to bear upon the portion $a^5$ of the enlargement $a^4$. Plate B may be bent to conform to the curve of the tire.

C is the outer clamping-plate, also preferably of brass and circular in form, and is provided with an orifice $c$, threaded corresponding with the portion $a'$. This plate C may also be made to conform with the curve of the tire, if desired.

In Fig. 6 I have illustrated a slight modification, the only difference being that in this construction I preferably enlarge the portion $a'$, and instead of the flat surface $a^5$ I preferably round the enlargement $a^4$, as at $a^6$, and countersink the plate B at $b'$ to fit the rounded portion $a^6$ of the enlargement.

From the foregoing description the operation of my device is obvious and is as follows:

The plate B is first placed upon the portion $a^2$ of the shank, which gives the plate a vertical position, practically parallel to the portions $a$ and $a'$ of the shank, as shown in Fig. 3, the plate being turned so that the lower point thereof will be in line with the portion $a'$ of the shank. With this arrangement the plate and portion $a$ of the shank may be gripped between the thumb and first finger or gripped by pincers or the like, the portion $a^3$ preventing the shank from turning or wabbling, whereby the plate may be readily inserted in the puncture or cut in the tire. To facilitate the insertion of the plate, the same may be dipped in cement, which forms a slippery coating therefor. The plate having been inserted in the tire, more cement is then forced into the cut and onto the plate, after which the shank is drawn through the plate until the flat portion $a^5$ of the enlargement $a^4$ engages the under side of the plate, and then the plate is drawn up against the inner surface of the tire, as shown in Fig. 4. The clamping-plate C is then placed upon the shank and screwed down on the portion $a'$ until it bears upon the tire sufficiently hard to prevent it from turning, cement having first been placed upon the inner side thereof, after which the shank may be gripped by the portion $a^3$ and turned until the plate C is forced down flush with the tire and the escapement of air from the puncture is prevented. The shank A is then sawed off flush with the top of the plate C and may, if desirable, be headed, thus completing the repair.

It is obvious that the operation of the modification is substantially the same as that described.

What I claim, and desire to secure by Letters Patent, is—

1. In a tire repair device, the combination with a shank having a portion angularly disposed to other portions, of an inner clamping-plate provided with an orifice adapted to loosely embrace said shank to permit free movement of said plate longitudinally of said shank, a retaining device on one end of said shank, an exterior clamping-plate provided with an orifice and adapted to fit onto said shank and means for clamping the tire between said plates, substantially as described.

2. In a tire repair device, the combination with a shank having a portion angularly disposed to other portions, a retaining device on one end of the shank, a portion of said shank adjacent said retaining device being screw-threaded, an inner clamping-plate provided with an orifice adapted to loosely embrace said shank to permit the free movement of said plate longitudinally of said shank, and an exterior clamping-plate provided with an internally-threaded orifice corresponding with said threaded portion of the shank, substantially as described.

3. In a tire repair device, the combination with a shank having a portion angularly disposed to other portions, a retaining device on one end of the shank, a portion of said shank adjacent to said retaining device being screw-threaded, an inner clamping-plate provided with an orifice adapted to loosely embrace said shank to permit the free movement of said plate longitudinally of said shank, an exterior clamping-plate provided with an orifice internally threaded correspondingly with said threaded portion of the shank and means whereby said shank can be turned to draw said plates together, substantially as described.

4. In a tire repair device, the combination with a shank having a portion angularly disposed to other portions, a retaining device on one end of the shank, a portion of said shank adjacent to said retaining device being screw-threaded, an inner clamping-plate provided with an orifice adapted to loosely embrace said shank to permit the free movement of said plate longitudinally of said shank, an exterior clamping-plate provided with an orifice internally threaded correspondingly with said threaded portion of the shank and an arm on said shank whereby the same can be turned to draw said clamping-plates together, substantially as described.

5. In a tire repair device, the combination with a shank having a portion angularly disposed to other portions, a retaining device on one end of the shank, a portion of said shank adjacent to said retaining device being screw-threaded, an inner clamping-plate provided with an orifice adapted to loosely embrace said shank to permit the free movement of said plate longitudinally of said shank, an exterior clamping-plate provided with an orifice internally threaded correspondingly with said threaded portion of the shank and an arm on said shank extending in a plane perpendicular to said angular portion of said shank, substantially as described.

6. In a tire repair device, the combination with a shank having its intermediate portion bent at an angle to its ends, an arm on said shank angularly disposed to said intermediate portion, a retaining device on one end of said shank, a portion of said shank adjacent to said retaining device being screw-threaded, an inner clamping-plate provided with an orifice adapted to loosely embrace said shank to permit free movement of said plate longitudinally of said shank and an outer clamping-plate provided with an orifice internally threaded correspondingly with said threaded portion of the shank, substantially as described.

In testimony whereof I affix my signature in the presence of two witnesses.

JOHN R. VOSBURGH.

Witnesses:
EDWARD QUIGLEY,
F. E. MOYER.